(12) United States Patent
Yin et al.

(10) Patent No.: US 12,421,571 B2
(45) Date of Patent: Sep. 23, 2025

(54) METHOD OF EXTRACTING LITHIUM FROM SPODUMENE AND MEANWHILE RECOVERING LOW IRON AND LOW SULFUR SILICON ALUMINUM MICRO-POWDER, HIGH PURITY GYPSUM, TANTALUM NIOBIUM CONCENTRATE AND LITHIUM RICH IRON MATERIAL

(71) Applicants: TIANQI LITHIUM CORPORATION, Sichuan (CN); TIANQI LITHIUM GENESIS TECHNOLOGY (SHENZHEN) LTD., Guangdong (CN)

(72) Inventors: Zhigang Yin, Suining (CN); Xingxing Deng, Suining (CN); Jie Zhang, Suining (CN); Chuan Xu, Suining (CN); Yibao Gao, Suining (CN)

(73) Assignees: TIANQI LITHIUM CORPORATION, Suining (CN); TIANQI LITHIUM GENESIS TECHNOLOGY (SHENZHEN) LTD., Shenzhen (CN)

( * ) Notice: Subject to any disclaimer, the term of this patent is extended or adjusted under 35 U.S.C. 154(b) by 0 days.

(21) Appl. No.: 18/840,595

(22) PCT Filed: Jan. 26, 2024

(86) PCT No.: PCT/CN2024/074187
§ 371 (c)(1),
(2) Date: Aug. 22, 2024

(87) PCT Pub. No.: WO2024/141117
PCT Pub. Date: Jul. 4, 2024

(65) Prior Publication Data
US 2025/0109456 A1    Apr. 3, 2025

(30) Foreign Application Priority Data
Sep. 19, 2023    (CN) .......................... 202311209262.4

(51) Int. Cl.
*B22F 9/04*    (2006.01)
*C01F 11/46*    (2006.01)
(Continued)

(52) U.S. Cl.
CPC ................ *C22B 26/12* (2013.01); *B22F 9/04* (2013.01); *C01F 11/46* (2013.01); *C22B 3/04* (2013.01);
(Continued)

(58) Field of Classification Search
None
See application file for complete search history.

(56) References Cited

U.S. PATENT DOCUMENTS

2022/0324755 A1    10/2022    Magnan et al.
2023/0095612 A1*    3/2023    Rezaee ..................... C22B 1/02
                                                              423/21.1
(Continued)

FOREIGN PATENT DOCUMENTS

CA    3236807 A1 *    6/2023
CN    103601230 A    2/2014
(Continued)

OTHER PUBLICATIONS

English translation of CN 113462906 (originally published Oct. 1, 2021), obtained from PE2E search.*
(Continued)

*Primary Examiner* — George Wyszomierski
(74) *Attorney, Agent, or Firm* — Oliff PLC (57) ABSTRACT

A method of extracting lithium from spodumene and meanwhile recovering low iron and low sulfur silicon aluminum
(Continued)

micro-powder, high purity gypsum, tantalum niobium concentrate and lithium rich iron material includes: mixing and leaching the lithium extraction acid clinker of spodumene with water; filtering the leached pulp to obtain the filtrate and the filter residue; neutralizing the filtrate; filtering the neutralized pulp to obtain the filtrate and high purity gypsum, extracting lithium from the filtrate to obtain lithium salt; neutralizing and mixing the filter residue to obtain the coarse and fine particles by classification; carrying out weak magnetic separation of fine particles to obtain lithium rich iron material and non-magnetic material; and carrying out strong magnetic separation, strong magnetic material gravity separation and tantalum niobium crude concentrate pickling on the non-magnetic material to obtain tantalum niobium concentrate.

18 Claims, 2 Drawing Sheets

(51) Int. Cl.
- *C22B 3/04* (2006.01)
- *C22B 3/22* (2006.01)
- *C22B 21/00* (2006.01)
- *C22B 26/12* (2006.01)
- *C22B 34/24* (2006.01)

(52) U.S. Cl.
CPC ............ *C22B 3/22* (2013.01); *C22B 21/0015* (2013.01); *C22B 34/24* (2013.01); *B22F 2009/043* (2013.01); *B22F 2301/052* (2013.01); *B22F 2301/35* (2013.01); *B22F 2998/10* (2013.01)

(56) References Cited

U.S. PATENT DOCUMENTS

| | | | | |
|---|---|---|---|---|
| 2023/0107938 | A1* | 4/2023 | Nishikawa | ............ C22B 7/007 |
| | | | | 75/10.67 |
| 2024/0391790 | A1* | 11/2024 | Guo | ............ C22B 3/10 |

FOREIGN PATENT DOCUMENTS

| | | | |
|---|---|---|---|
| CN | 106082739 | A | 11/2016 |
| CN | 108147658 | A | 6/2018 |
| CN | 108273826 | A | 7/2018 |
| CN | 111302708 | A | 6/2020 |
| CN | 113462906 | A * | 10/2021 |
| CN | 113511848 | A | 10/2021 |
| CN | 214488258 | U | 10/2021 |
| CN | 113976309 | A | 1/2022 |
| CN | 114226413 | A | 3/2022 |
| CN | 216459396 | U | 5/2022 |
| CN | 115974105 | A | 4/2023 |
| CN | 116532235 | A | 8/2023 |
| CN | 117165787 | A | 12/2023 |
| WO | 2011/001288 | A2 | 1/2011 |
| WO | 2019/141098 | A1 | 7/2019 |

OTHER PUBLICATIONS

May 8, 2024 International Search Report issued in International Patent Application No. PCT/CN2024/074187.

Deng et al., "Study on the Process Mineralogy of a Spodumene Smelting Slag", Modern Mining, Jul. 27, 2023.

May 8, 2024 Written Opinion issued in PCT/CN2024/074187.

* cited by examiner

Fig. 1

Fig. 2: PriorArt – Traditional Method

METHOD OF EXTRACTING LITHIUM FROM SPODUMENE AND MEANWHILE RECOVERING LOW IRON AND LOW SULFUR SILICON ALUMINUM MICRO-POWDER, HIGH PURITY GYPSUM, TANTALUM NIOBIUM CONCENTRATE AND LITHIUM RICH IRON MATERIAL

CROSS-REFERENCE TO RELATED APPLICATIONS

This is an application which claims the benefits and priorities of the Chinese Patent Application Number CN2023112092624, filed on Sep. 19, 2023, and the disclosure of which is incorporated herein by reference in its entirety.

TECHNICAL FIELD

The present invention relates to the technical field of comprehensive recovery and utilization of mineral resources, in particular to a method of extracting lithium from spodumene and meanwhile recovering low iron and low sulfur silicon aluminum micro-powder, high purity gypsum, tantalum niobium concentrate and lithium rich iron material.

BACKGROUND

Using spodumene to extract lithium salt, 1 ton of lithium carbonate will produce 8-10 tons of lithium refinery residue. The statistics of the China Non-Ferrous Metals Industry Association show that China's basic lithium salt production in 2022 was as follows: 395,000 tons of lithium carbonate, 246,400 tons of lithium hydroxide, 22,200 tons of lithium chloride, producing about 5 million tons of lithium refinery residue a year. With the rapid increase in demand for lithium salt products due to the development of the downstream new energy industries, the accumulation and disposal of a large number of spodumene acid leaching slag has brought serious ecological and environmental problems, and the safe disposal of lithium refinery residue will become an important factor limiting the healthy development of the new energy industry chain. The existing reports show that spodumene leaching residue is mainly used in cement, concrete, ceramics and other traditional building material industries with lower economic value; there are also application studies in the fields of using lithium slag to prepare zeolite molecular sieves, porous environmental protection materials, lithium adsorption materials and geopolymer cementing materials, which are still at the laboratory research and development stage and have the shortcomings of small market capacity and economy. How to comprehensively recover and utilize the spodumene acid leaching residue with high value and high efficiency and turn waste into treasure has become an urgent problem, thus providing a new way to alleviate environmental pressure and solving the bottleneck restricting the development of the new energy industry chain.

Among the prior arts, CN111302708A discloses a comprehensive utilization technology of large-volume lithium leaching residue and its realization method, which uses lithium leaching residue, admixture, activator, water reducing agent, and chelating agent and other raw material to prepare lithium slag geopolymer. Although this patent solves the utilization problem of lithium leaching residue, its effect on the high-value utilization of lithium slag is not obvious.

CN103601230A discloses a method of comprehensive utilization of lithium leaching residue to produce chemical raw materials, which obtains calcium chloride, ammonium fluoride, white carbon black, aluminum salt, ammonium sulfate and other products through the lithium leaching residue and hydrochloric acid reaction, filtration and other steps. This patent raises high equipment requirements in the operation process, and meanwhile the steps are complicated, the operation is difficult, and the feasibility of industrial application needs to be studied.

CN113511848A discloses a comprehensive utilization method of lithium leaching residue, the byproduct of lithium ore, the patent uses lithium leaching residue and alkali to prepare sodium silicate and then mixes the residue with fly ash, red mud, cement and sand to prepare baking-free bricks. This patent involves strong alkali and does not comprehensively recover the valuable components in lithium leaching residue, so there is a waste of resources.

CN106082739A discloses a new type of lithium leaching residue powder and its preparation method and application. The patent produces solid hydrated calcium silicate and calcium aluminate by chemical reaction between $Ca(OH)_2$ in alkali process lithium leaching residue and amorphous Si and Al in acid process lithium leaching residue, thus solving the problem that the initial setting time strength of cement is greatly reduced when the acid process lithium leaching residue is used as the cement admixture. But influenced by the lithium salt industry chain and the region, the technology is difficult to implement.

CN108273826A discloses a full-phase high-value recovery and utilization method of lithium leaching residue. The patent obtains pyrophyllite raw material for glass fiber through pulping, carbonate reaction and magnetic separation. The method needs crystallization to recover sulfate products, with the disadvantages of high cost and low conversion efficiency of alkali reaction, and it is difficult to realize industrial application. The patent CN108147658A obtains pyrophyllite raw material for glass fiber through pulping, physical dressing desulfurization, magnetic separation of iron removal and other steps. The pyrophyllite raw material for glass fiber produced by this method has the disadvantage of high iron and high sulfur, and its application is subject to certain restrictions.

CN214488258U discloses a comprehensive recovery and utilization system of lithium slag, which carries out comprehensive utilization of lithium extraction leaching residue of spodumene through pre-grinding, water cycle classification, flotation desulfurization, weak-strong magnetic separation of iron removal and other technologies; and the system fails to comprehensively recover lithium and iron in lithium leaching residue, resulting in a waste of resources.

CN113976309A discloses a method of comprehensive recovery of lithium, tantalum niobium, silicon aluminum micro-powder, iron concentrate and gypsum from lithium slag, which obtains coarse-grained niobium tantalum rich material and coarse-grained iron concentrate through gravity separation-weak magnetic separation, and meanwhile obtains high purity gypsum concentrate and low iron and low sulfur silicon aluminum micro-powder through flotation and weak-strong magnetic separation. Although high-value comprehensive utilization of lithium slag is carried out, there are some shortcomings in the preparation of silicon aluminum micro-powder and gypsum by this process, such as the process of preparing high-grade gypsum products from gypsum is complex and produce secondary slag and other drawbacks, which eventually leads to high production cost and economic benefits to be improved.

Traditional lithium extraction from spodumene mainly adopts spodumene roasting (crystal transformation of α spodumene to β spodumene)-grinding-acidizing roasting-pulping and leaching-neutralization-filtration, the filtered lithium-contained liquid is used for lithium extraction, and the main reports involved in the resource utilization of the filtered filter residue include CN108273826A, CN108147658A, CN 113976309A, CN114226413A, CN116532235A, CN214488258U and CN216459396U and other patents. These methods have poor efficiency in separating gypsum from other minerals. Because flotation or alkali conversion is usually used to separate gypsum from other minerals, there are problems such as poor separation effect, high cost, low efficiency and desalting of circulating water. In addition, the silicon aluminum micro-powder prepared by these methods has the drawbacks of high iron, high sulfur and low yield. The downstream glass fiber, ceramic fiber and other industries have high requirements for the impurity iron and sulfur contents in raw materials, and the impurity iron and sulfur in the silicon aluminum micro-powder prepared by these methods usually exceed the standards, resulting in that the silicon aluminum micro-powder can only be added in the way of auxiliary materials and it cannot be widely applied.

In view of this, it is necessary and of great significance to provide a method of extracting lithium from spodumene and meanwhile recovering low iron and low sulfur silicon aluminum micro-powder, high purity gypsum, tantalum niobium concentrate and lithium rich iron material.

SUMMARY

In order to overcome the above technical defects, the method of extracting lithium from spodumene and meanwhile recovering low iron and low sulfur silicon aluminum micro-powder, high purity gypsum, tantalum niobium concentrate and lithium rich iron material claimed in the present invention can also realize the efficient separation of each component, especially the pre-separation of gypsum and other minerals in the process of extracting lithium, thus simplifying the technical route for the subsequent high-value utilization of lithium slag extracted from spodumene.

A method of extracting lithium from spodumene and meanwhile recovering low iron and low sulfur silicon aluminum micro-powder, high purity gypsum, tantalum niobium concentrate and lithium rich iron material, including the following steps:
  a: Mix and leach the lithium extraction acid clinker of spodumene with water to obtain the leached pulp;
  b: Filter the leached pulp in step a, wash the filter residue with water, and combine the washing liquid with the filtrate to obtain the filtrate 1 and the filter residue 1;
  c: Neutralize the filtrate 1 in step b to obtain the neutralized pulp;
  d: Filter the neutralized pulp in step c, wash the filter residue with water, combine the washing liquid with the filtrate to obtain the filtrate 2 and high purity gypsum, and extract lithium from the filtrate 2 to obtain lithium salt;
  e: Neutralize and mix the filter residue 1 in step b to obtain coarse and fine particles by classification;
  f: Grind the coarse particles in step e and return to step e;
  g: Carry out weak magnetic separation of fine particles in step e to obtain lithium rich iron material 1 and the non-magnetic material;
  h: Carry out strong magnetic separation of the non-magnetic material 1 in step g to obtain silicon aluminum micro-powder and the strong magnetic material;
  i: Carry out the weak magnetic material by gravity separation in step h to obtain lithium rich iron material 2 and tantalum niobium crude concentrate;
  j: Pickle the tantalum niobium crude concentrate in step i to obtain tantalum niobium concentrate.

In one of the embodiments of the present invention, in step a, the concentration of the leached pulp is 30-60%.

In one of the embodiments of the present invention, in step a, the lithium extraction acid clinker is obtained from spodumene concentrate through high temperature phase transition, meanwhile react with concentrated sulfuric acid.

In one of the embodiments of the present invention, in step c, alkali 1 is added to the filtrate 1 to regulate pH to 6-7.

In one of the embodiments of the present invention, the alkali 1 is any one or more of calcium carbonate, calcium hydroxide and calcium oxide.

In one of the embodiments of the present invention, in step c, the concentration of the neutralized pulp is 5-20%.

In one of the embodiments of the present invention, in step d, the filtration adopts at least one of a plate-and-frame filter press, a belt filter and a centrifuge.

In one of the embodiments of the present invention, in step e, the neutralizing and mixing is to add alkali 2 to the filter residue 1 for pulping and regulate the pH to 6.5-7.5.

In one of the embodiments of the present invention, the alkaline substance in the alkali 2 is at least one of calcium carbonate, calcium hydroxide and calcium oxide.

In one of the embodiments of the present invention, in step e, the classification is at least one of hydrocyclone, mechanical vibrating screen and spiral classifier.

In one of the embodiments of the present invention, in step f, the grinding is at least one of ball mill grinding, vertical mill grinding and tower mill grinding.

In one of the embodiments of the present invention, in step f, the grinding is ball mill grinding.

In one of the embodiments of the present invention, the ball mill medium of the ball mill grinding is a steel ball, a steel forging, a steel bar, a zirconia ball, an alumina ball or a ceramic ball.

In one of the embodiments of the present invention, in step f, the pulp concentration of the grinding is 40-60%.

In one of the embodiments of the present invention, the magnetic field intensity of the weak magnetic separation is 0.05-0.3 T; and the magnetic field intensity of the strong magnetic separation is 1.0-1.7 T.

In one of the embodiments of the present invention, in step g, the pulp concentration of the weak magnetic separation of fine particles is 20-30%.

In one of the embodiments of the present invention, in step h, the pulp concentration of the strong magnetic separation of non-magnetic material 1 is 15-25%.

In one of the embodiments of the present invention, in step i, the pulp concentration of the gravity separation is 10-30%.

In one of the embodiments of the present invention, in step i, the gravity separation adopts at least one of a table concentrator, a spiral chute, a blanket machine, a centrifuge and a reciprocating separator.

In one of the embodiments of the present invention, in step j, the pickling adopts the acid with a concentration of 5-40%, and the acid is at least one of sulfuric acid, hydrochloric acid and oxalic acid.

In the present invention, the magnetic field intensity in the process of weak magnetic separation is 0.05-0.3 T, and the strong magnetic minerals in the fine particles are more easily separated, so the strong magnetic lithium rich iron material and the non-magnetic material containing weak magnetic minerals can be obtained based on the weak magnetic separation; the magnetic field intensity in the process of strong magnetic separation is 1.0-1.7 T, and the weak magnetic minerals in the non-magnetic material are separated in the strong magnetic field to obtain the weak magnetic product and the non-magnetic product, and the weak magnetic product in the non-magnetic material can be separated more thoroughly.

The beneficial effects of the present invention are as follows: 1. The present invention directly filters the acid clinker after leaching, and then adds alkali to the obtained filtrate for neutralization to separate the high purity gypsum. Compared with the traditional direct neutralization of acid clinker, the present invention has the advantages of short process, complete separation of gypsum, good separation effect and high purity of gypsum and other advantages, and meanwhile reduces the loss of useful minerals, simplifies the process flow and realizes the resource recovery and comprehensive utilization of spodumene minerals; 2. The present invention reduces grinding processing capacity, saves energy dosage and has low processing cost through the process steps of first grading and then grinding; 3. The present invention can effectively enrich tantalum niobium minerals and realize efficient separation of tantalum niobium ores from lithium slag through the process steps of grinding, magnetic separation and gravity separation, and can realize refining of tantalum niobium ores through pickling; 4. The present invention has the advantages of simple process flow and low processing cost, and can realize efficient comprehensive recovery of lithium, tantalum niobium, low iron and low sulfur silicon aluminum micro-powder and high purity gypsum from lithium leaching residue; a plate-and-frame filter, a belt filter or a centrifuge is mainly used for separation of gypsum, with a small land area, good gypsum separation effect and high gypsum product quality; the recovery of gypsum can be realized by pre-separation of lithium extraction acid clinker after pulping without adding gypsum collector in the recovery process, and the recovered gypsum has high purity; 5. The present invention adopts the process step of solid-liquid pre-separation, and the contents of sulfur and iron in the finally obtained silicon aluminum micro-powder are low, wherein, the content calculated by $Fe_2O_3$ is less than 0.40%; the content calculated by $SO_3$ is less than 0.18%, and the obtained low iron and low sulfur silicon aluminum micro-powder can be widely applied in the downstream industries, such as glass fiber, ceramic fiber, filler and others.

DETAILED DESCRIPTION

In order to make the purpose, technical solutions and advantages of the present invention more clear, the following solutions are combined to further elaborate the present invention. Obviously, the embodiments described are only partial embodiments of the present invention and not all embodiments. Based on the embodiments of the present invention, any other embodiments obtained by a person skilled in the art without any creative work will fall within the protection scope of the present invention.

A method of extracting lithium from spodumene and meanwhile recovering low iron and low sulfur silicon aluminum micro-powder, high purity gypsum, tantalum niobium concentrate and lithium rich iron material, including the following steps:

a: Mix and leach the lithium extraction acid clinker of spodumene with water to obtain the leached pulp;

b: Filter the leached pulp in step a, wash the filter residue with water, and combine the washing liquid with the filtrate to obtain the filtrate 1 and the filter residue 1;

c: Neutralize the filtrate 1 in step b to obtain the neutralized pulp;

d: Filter the neutralized pulp in step c, wash the filter residue with water, combine the washing liquid with the filtrate to obtain the filtrate 2 and high purity gypsum, and extract lithium from the filtrate 2 to obtain lithium salt;

e: Neutralize and mix the filter residue 1 in step b to obtain coarse and fine particles by classification;

f: Grind the coarse particles in step e and return to step e;

g: Carry out weak magnetic separation of fine particles in step e to obtain lithium rich iron material and the non-magnetic material;

h: Carry out strong magnetic separation of the non-magnetic material 1 in step g to obtain silicon aluminum micro-powder and the strong magnetic material;

i: Carry out the weak magnetic material by gravity separation in step h to obtain lithium rich iron material 2 and tantalum niobium crude concentrate;

j: Pickle the tantalum niobium crude concentrate in step i to obtain tantalum niobium concentrate.

In some embodiments, in step a, the concentration of the leached pulp is 30-60%.

In some embodiments, in step a, the lithium extraction acid clinker is obtained from spodumene concentrate through high temperature phase transition, meanwhile react with concentrated sulfuric acid.

In some embodiments, in step c, alkali 1 is added to the filtrate 1 to regulate pH to 6-7.

In some embodiments, the alkali 1 is any one or more of calcium carbonate, calcium hydroxide and calcium oxide.

In some embodiments, in step c, the concentration of the neutralized pulp is 5-20%.

In some embodiments, in step d, the filtration adopts at least one of a plate-and-frame filter press, a belt filter and a centrifuge.

In some embodiments, in step d, the lithium extraction is to obtain lithium salt products after the filtrate 2 is treated by deep impurity removal and lithium deposition in sequence.

In some embodiments, in step e, the neutralizing and mixing is to add alkali 2 to the filter residue 1 for pulping and regulate the pH to 6.5-7.5.

In some embodiments, the alkaline substance in the alkali 2 is at least one of calcium carbonate, calcium hydroxide and calcium oxide.

In some embodiments, in step e, the classification is at least one of hydrocyclone, mechanical vibrating screen and spiral classifier.

In some embodiments, in step f, the grinding is at least one of ball mill grinding, vertical mill grinding and tower mill grinding.

In some embodiments, in step f, the grinding is ball mill grinding.

In some embodiments, the ball mill medium of the ball mill grinding is a steel ball, a steel forging, a steel bar, a zirconium ball, an alumina ball or a ceramic ball.

In some embodiments, in step f, the pulp concentration of the grinding is 40-60%.

In some embodiments, the magnetic field intensity of the weak magnetic separation is 0.05-0.3 T; and the magnetic field intensity of the strong magnetic separation is 1.0-1.7 T.

In some embodiments, in step g, the pulp concentration of the weak magnetic separation of fine particles is 20-30%.

In some embodiments, in step h, the pulp concentration of the strong magnetic separation of non-magnetic material 1 is 15-25%.

In some embodiments, in step i, the pulp concentration of the gravity separation is 10-30%.

In some embodiments, in step i, the gravity separation adopts at least one of a table concentrator, a spiral chute, a blanket machine, a centrifuge and a reciprocating separator.

In one of the embodiments of the present invention, in step j, the pickling adopts the acid with a concentration of 5-40%, and the acid is at least one of sulfuric acid, hydrochloric acid and oxalic acid.

In order to further demonstrate the effect of the method of extracting lithium from spodumene and meanwhile recovering low iron and low sulfur silicon aluminum micro-powder, high purity gypsum, tantalum niobium concentrate and lithium rich iron material provided in the present invention in improving the recovery and utilization of spodumene ore resources, the following embodiments and comparative examples are provided:

Embodiment 1

The embodiment provides a method of extracting lithium from spodumene and meanwhile recovering low iron and low sulfur silicon aluminum micro-powder, high purity gypsum, tantalum niobium concentrate and lithium rich iron material, and the specific steps are as follows:
1) Add water to the acid clinker, mix and leach it to obtain the pulp A with a solid concentration of 30%, and filter the pulp A to obtain the filter residue and the filtrate; wherein, the acid clinker is obtained from spodumene concentrate through high-temperature phase transition, meanwhile react with concentrated sulfuric acid, and the statistics of the chemical component analysis results of spodumene concentrate are shown in Table 1.

Note: In view of the low tantalum niobium content in spodumene concentrate, the test results of different batches of spodumene concentrate have a certain fluctuation range, and the test results of the same spodumene concentrate samples based on GB/T 15076.1-2017 and GB/T 15076.2-2019 also have fluctuations, which is a normal phenomenon. The results of $Nb_2O_5$ and $Ta_2O_5$ in Table 1 are the average values of the same sample after three parallel measurements.
2) Add calcium carbonate to the filtrate obtained in step 1) for neutralization to obtain the pulp B, with a concentration of 10% and a pH of 6.5;
3) Filter the pulp B obtained in step 2) to obtain high purity gypsum and lithium rich solution, the lithium rich solution is directly used for lithium extraction. Wherein, the particle size of the obtained high purity gypsum is 1-74 μm;
4) Add water to the filter residue obtained in step 1) for pulping, with a pulp concentration of 25%, and meanwhile add calcium carbonate to regulate the pH to 7.0;
5) Separation on the pulp obtained in step 4) with a hydrocyclone to obtain coarse-grained and fine-grained products by hydrocyclone, and ensure that the content of −325 mesh in the fine-grained product is greater than 90%;
6) Carry out weak magnetic separation on the fine-grained pulp obtained in step 5) with a magnetic field intensity of 0.2 T and a pulp concentration of 30% to obtain lithium rich iron material and non-magnetic product;
7) Add the coarse-grained product in step 5) to the mill for grinding, wherein the grinding medium is a steel ball, the grinding concentration is 60%, the content of the product with grinding fineness of −325 mesh is greater than 80%, and the ores discharged by the mill return to step 5) for further grading;
8) Carry out strong magnetic separation on the non-magnetic product obtained in step 6) with a magnetic field intensity of 1.5 T and a pulp concentration of 25% to obtain the weak magnetic product and low iron and low sulfur silicon aluminum micro-powder;
9) Carry out gravity separation on the weak magnetic product obtained in step 8) with a table concentrator, with a pulp concentration of 20%, to obtain tantalum niobium crude concentrate and lithium rich iron material;
10) Add 20% sulfuric acid solution to the tantalum niobium crude concentrate obtained in step 9), stir and leach it at the room temperature for 2 hours, and obtain tantalum niobium concentrate after solid-liquid separation;

TABLE 1

Chemical components and contents of spodumene concentrate

| | Chemical component | | | | | | | |
|---|---|---|---|---|---|---|---|---|
| | $Li_2O$ (%) | $Nb_2O_5$ (ppm) | $Ta_2O_5$ (ppm) | BeO (%) | $SiO_2$ (%) | $Fe_2O_3$ (%) | $Al_2O_3$ (%) | $P_2O_5$ (%) |
| Content | 6.13 | 85 | 62 | 0.188 | 63.86 | 1.34 | 23.81 | 0.46 |
| | Chemical component | | | | | | | |
| | MnO (%) | $K_2O$ (%) | $Na_2O$ (%) | CaO (%) | $Rb_2O$ (%) | $Cs_2O$ (%) | Ga (%) | Sn (%) |
| Content | 0.79 | 0.42 | 0.70 | 1.50 | 0.055 | 0.00624 | 0.0121 | 0.0646 |

11) Filter, dry and bag the high purity gypsum obtained in step 3), the silicon aluminum micro-powder obtained in step 8) and the tantalum niobium concentrate obtained in step 9) and step 10) to obtain high purity gypsum, silicon aluminum micro-powder, tantalum niobium concentrate and lithium rich iron material in turn.

Embodiment 2

The embodiment provides a method of extracting lithium from spodumene and meanwhile recovering low iron and low sulfur silicon aluminum micro-powder, high purity gypsum, tantalum niobium concentrate and lithium rich iron material, and the specific steps are as follows:
1) Add water to the acid clinker, mix and leach it to obtain the pulp A with a concentration of 45%, and filter the pulp A to obtain the filter residue and the filtrate;
2) Add calcium oxide (lime) to the filtrate obtained in step 1) to obtain the pulp B, with a pH of 6.5 and a concentration of 5%;
3) Filter the pulp B obtained in step 2) to obtain high purity gypsum and lithium rich solution, which is directly used for lithium extraction;
4) Add water to the filter residue obtained in step 1) for pulping, with a pulp concentration of 25%, and meanwhile add calcium oxide (lime) to regulate the pH to 6.5;
5) Separation on the pulp obtained in step 4) to obtain coarse-grained and fine-grained products by spiral classifier, and ensure that the content of −325 mesh in the obtained fine-grained product is greater than 90%;
6) Carry out weak magnetic separation on the fine-grained product obtained in step 5) with a magnetic field intensity of 0.3 T and a pulp concentration of 20% to obtain lithium rich iron material and non-magnetic product;
7) Add the coarse-grained product in step 5) to the mill for grinding, wherein the grinding medium is a ceramic ball, the grinding concentration is 50%, the content of the product with grinding fineness of −325 mesh is greater than 70%, and the ores discharged by the mill return to step 5) for further grading;
8) Carry out strong magnetic separation on the non-magnetic product in step 6) with a magnetic field intensity of 1.6 T and a pulp concentration of 20% to obtain and the weak magnetic product and low iron and low sulfur silicon aluminum micro-powder;
9) Carry out gravity separation on the weak magnetic product in step 8) by the combined process of a blanket machine and a table concentrator, with a pulp concentration of 15%, to obtain tantalum niobium crude concentrate and lithium rich iron material;
10) Add 10% sulfuric acid solution to the tantalum niobium crude concentrate in step 9), stir and leach it at the room temperature for 4 hours, and obtain tantalum niobium concentrate after solid-liquid separation;
11) Filter, dry and bag the high purity gypsum obtained in step 3), the low iron and low sulfur silicon aluminum micro-powder obtained in step 8) and the products obtained in step 9) and step 10) to obtain high purity gypsum, low iron and low sulfur silicon aluminum micro-powder, tantalum niobium concentrate and lithium rich iron material in turn.

Embodiment 3

The embodiment provides a method of extracting lithium from spodumene and meanwhile recovering low iron and low sulfur silicon aluminum micro-powder, high purity gypsum, tantalum niobium concentrate and lithium rich iron material, and the specific steps are as follows:
1) Add water to the acid clinker, mix and leach it to obtain the pulp A with a concentration of 55%, and filter the pulp A to obtain the filter residue and the filtrate;
2) Add calcium hydroxide to the filtrate obtained in step 1) to obtain the pulp B, with a pH and a concentration of 4.5%;
3) Filter the pulp B obtained in step 2) to obtain high purity gypsum and lithium rich solution, which is directly used for lithium extraction;
4) Add water to the filter residue obtained in step 1) for pulping, with a pulp concentration of 25%, and meanwhile add calcium hydroxide to regulate the pH to 7.0;
5) Separation on the pulp obtained in step 4) to obtain coarse-grained and fine-grained products by spiral classifier, and ensure that the content of −325 mesh in the obtained fine-grained product is greater than 90%;
6) Carry out weak magnetic separation on the fine-grained product obtained in step 5) with a magnetic field intensity of 0.2 T and a pulp concentration of 28% to obtain lithium rich iron material and non-magnetic product;
7) Add the coarse-grained product in step 5) to the mill for grinding, wherein the grinding medium is a ceramic ball, the grinding concentration is 50%, the content of the product with grinding fineness of −325 mesh is greater than 75%, and the ores discharged by the mill return to step 5) for further grading;
8) Carry out strong magnetic separation on the non-magnetic product in step 6) with a magnetic field intensity of 1.7 T and a pulp concentration of 20% to obtain and the weak magnetic product and low iron and low sulfur silicon aluminum micro-powder;
9) Carry out gravity separation on the weak magnetic product in step 8) by the combined process of a reciprocating gravity separator and a table concentrator, with a pulp concentration of 15%, to obtain tantalum niobium crude concentrate and lithium rich iron material;
10) Add 15% sulfuric acid solution to the tantalum niobium crude concentrate in step 9), stir and leach it at the room temperature for 6 hours, and obtain tantalum niobium concentrate after solid-liquid separation;
11) Filter, dry and bag the high purity gypsum obtained in step 3), the low iron and low sulfur silicon aluminum micro-powder obtained in step 8) and the products obtained in step 9) and step 10) to obtain high purity gypsum, low iron and low sulfur silicon aluminum micro-powder, tantalum niobium concentrate and lithium rich iron material in turn.

Comparative Example 1

Figure 1:
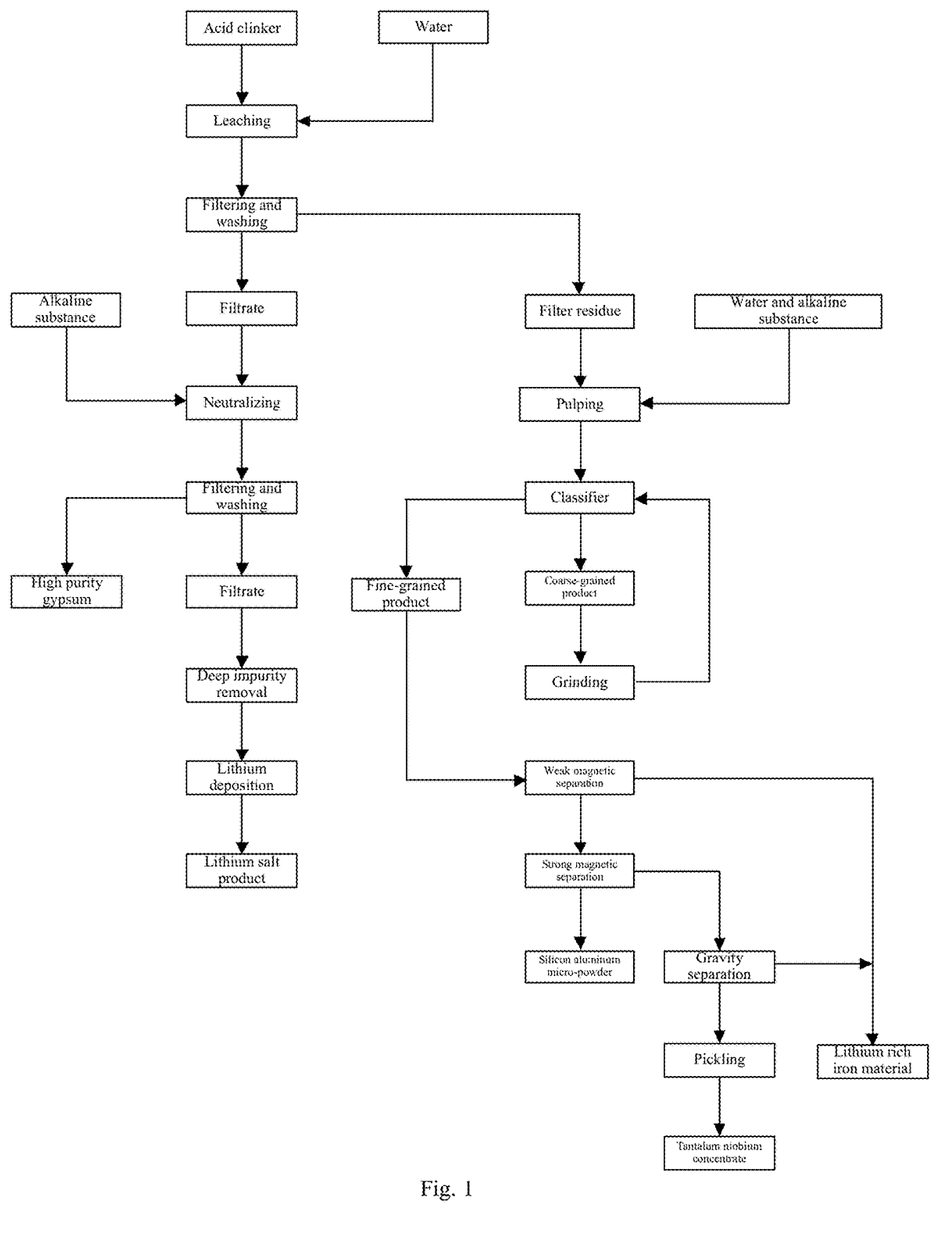
FIG. 1 is the process flow diagram of the method of extracting lithium from spodumene and meanwhile recovering low iron and low sulfur silicon aluminum micro-powder, high purity gypsum, tantalum niobium concentrate and lithium rich iron material of the present invention.
Figure 2:
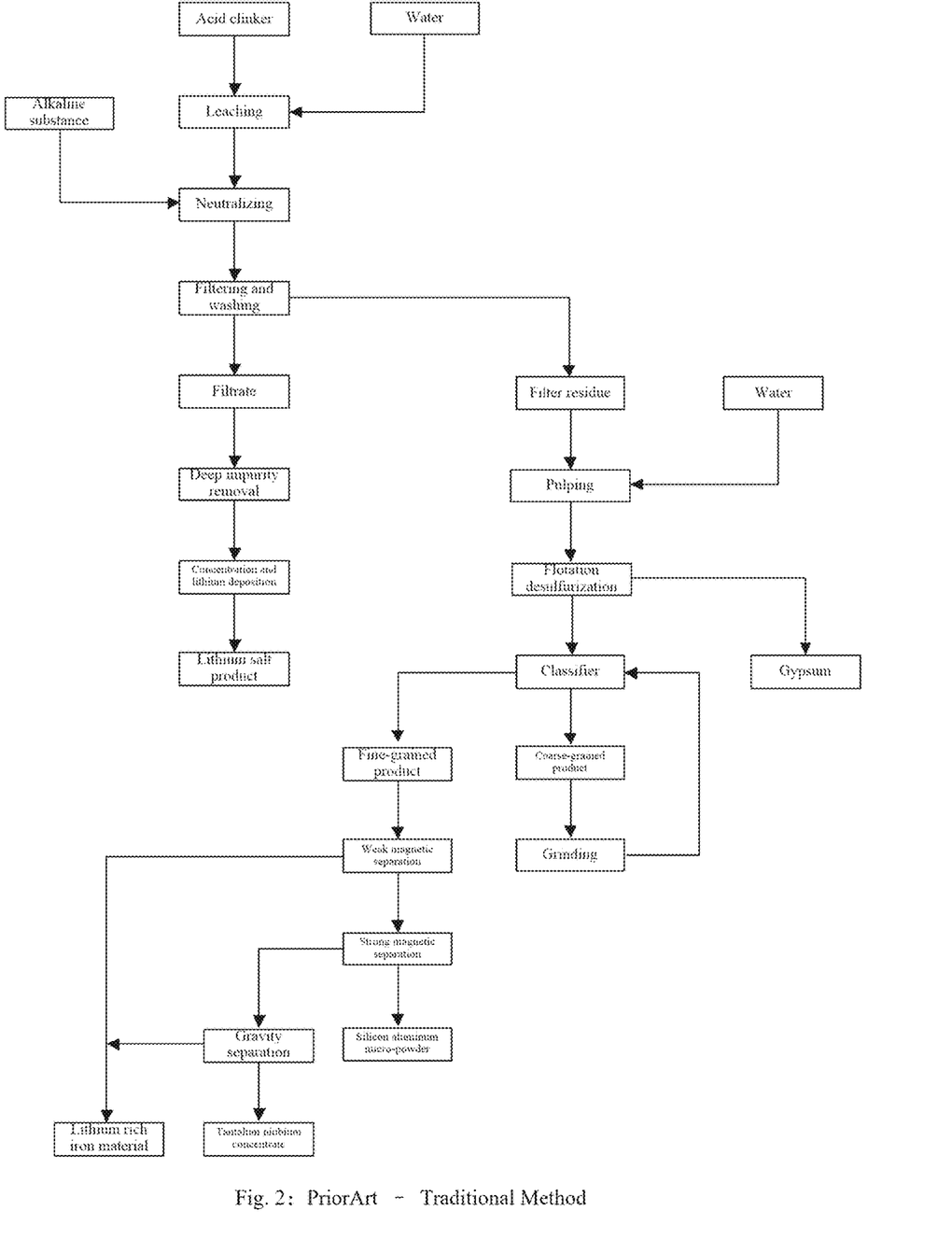
FIG. 2 is the process flow diagram of the Prior Art traditional method of extracting lithium from spodumene and meanwhile recovering low iron and low sulfur silicon aluminum micro-powder, high purity gypsum, tantalum niobium concentrate and lithium rich iron material.

Based on FIG. 2, the comparative example provides a traditional high value utilization process of the lithium slag from the spodumene lithium extractor, and the specific steps are as follows:
1) Add water to the acid clinker and mix and leach it to obtain the pulp A with a concentration of 30%;
2) Add calcium carbonate to the pulp obtained in step 1) to obtain the pulp B, with a pH of 7.0 and a concentration of 35%;
3) Filter the pulp B obtained in step 2) to obtain filter residue and lithium rich solution, the lithium rich solution is directly used for lithium extraction;

4) Add water to the filter residue in step 3) for pulping, and then carry out flotation desulfurization; wherein, the flotation pulp concentration is 33%, in roughing selection, the dosage of $Na_2SiO_3$ is 3000 g/t, and the dosage of gypsum collector is 200 g/t; in scavenging I, the dosage of $Na_2SiO_3$ is 1500 g/t and the dosage of gypsum collector is 150 g/t; in scavenging II, the dosage of $Na_2SiO_3$ is 500 g/t and the dosage of gypsum collector is 100 g/t; and in scavenging III, the dosage of $Na_2SiO_3$ is 500 g/t and the dosage of gypsum collector is 100 g/t;

Dehydrate and dry the gypsum concentrate obtained from flotation to obtain gypsum concentrate;

5) Separation on pulp obtained in step 4) with a hydrocyclone to obtain coarse-grained and fine-grained products by spiral classifier, and ensure that the content of −325 mesh in the fine-grained lithium slag is greater than 90%;

6) Add the coarse-grained product in step 5) to the mill for grinding, wherein the grinding medium is a steel ball, the grinding concentration is 60%, the content of the product with grinding fineness of −325 mesh is greater than 80%, and the ores discharged by the mill return to step 5) for further grading;

7) Carry out weak magnetic separation on the fine-grained pulp obtained in step 5) with a magnetic field intensity of 0.2 T and a pulp concentration of 30% to obtain lithium rich iron material and non-magnetic product;

8) Carry out strong magnetic separation on the non-magnetic product obtained in step 7) with a magnetic field intensity of 1.5 T and a pulp concentration of 30% to obtain the weak magnetic product and silicon aluminum micro-powder;

9) Carry out gravity separation on the weak magnetic product in step 8) with a table concentrator, with a pulp concentration of 20%, to obtain tantalum niobium concentrate and lithium rich iron material;

10) Filter, dry and bag the gypsum obtained in step 4), the silicon aluminum micro-powder obtained in step 8) and the tantalum niobium concentrate and lithium rich iron material obtained in step 9) to obtain gypsum, silicon aluminum micro-powder, tantalum niobium concentrate and lithium rich iron material in turn.

Comparative Example 2

The comparative example provides a traditional high value utilization process of the lithium slag from the spodumene lithium extractor, and the specific steps are as follows:

1) Add water to the acid clinker and mix and leach it to obtain the pulp A with a concentration of 45%;
2) Add calcium carbonate to the pulp A obtained in step 1) to obtain the pulp B, with a concentration of 35% and a pH of 6.5;
3) Filter the pulp B obtained in step 2) to obtain filter residue and lithium rich solution, the lithium rich solution is directly used for lithium extraction;
4) Add water to the filter residue in step 3) for pulping, and then carry out flotation desulfurization; wherein, the flotation pulp concentration is 30%, in roughing selection, the dosage of $Na_2SiO_3$ is 4000 g/t, and the dosage of gypsum collector is 200 g/t; in scavenging I, the dosage of $Na_2SiO_3$ is 2000 g/t and the dosage of gypsum collector is 100 g/t; in scavenging II, the dosage of $Na_2SiO_3$ is 1000 g/t and the dosage of gypsum collector is 50 g/t; and in scavenging III, the dosage of $Na_2SiO_3$ is 500 g/t and the dosage of gypsum collector is 25 g/t;

Dehydrate and dry the gypsum concentrate obtained from flotation to obtain gypsum concentrate;

5) Separation on the pulp obtained in step 4) with a spiral grader to obtain coarse-grained and fine-grained products by spiral classifier, and ensure that the content of −325 mesh of the lithium slag in the fine-grained product is greater than 90%;

6) Add the coarse-grained product in step 5) to the mill for grinding, wherein the grinding medium is a steel ball, the grinding concentration is 60%, the content of the product with grinding fineness of −325 mesh is greater than 80%, and the ores discharged by the mill return to step 5) for further grading;

7) Carry out weak magnetic separation on the fine-grained pulp obtained in step 5) with a magnetic field intensity of 0.25 T and a pulp concentration of 30% to obtain the strong magnetic product (lithium rich iron material) and the non-magnetic product;

8) Carry out strong magnetic separation on the non-magnetic product obtained in step 7) with a magnetic field intensity of 1.6 T and a pulp concentration of 30% to obtain the weak magnetic product and silicon aluminum micro-powder;

9) Carry out gravity separation on the weak magnetic product in step 8) by the combined process of a blanket machine and a table concentrator, with a pulp concentration of 20%, to obtain tantalum niobium concentrate and lithium rich iron material;

10) Filter, dry and bag the gypsum obtained in step 4), the silicon aluminum micro-powder obtained in step 8) and the tantalum niobium concentrate and lithium rich iron material obtained in step 9) to obtain gypsum, silicon aluminum micro-powder, tantalum niobium concentrate and lithium rich iron material in turn.

Performance Test:

Based on the lithium measurement method in *Methods for Chemical Analysis of Lithium, Rubidium and Cesium Ores* (GB/T 17413.1-2010), the content of lithium (calculated by $Li_2O$) in the silicon aluminum micro-powder and lithium rich iron material obtained in the embodiments 1-2 and the comparative examples 1-2 is determined;

Based on *Methods for Chemical Analysis of Tantalum and Niobium—Part 1: Determination of Tantalum Content in Niobium—Inductively Coupled Plasma Atomic Emission Spectrometry* (GB/T 15076.1-2017), the content of tantalum (calculated by $Ta_2O_5$) in the tantalum niobium concentrate in the embodiments 1-2 and the comparative examples 1-2 is determined;

Based on *Methods for Chemical Analysis of Tantalum and Niobium—Part 2: Determination of Niobium Content in Tantalum—Inductively Coupled Plasma Atomic Emission Spectrometry and Stratography Gravimetry* (GB/T 15076.2-2019), the content of niobium (calculated by $Nb_2O_5$) in the tantalum niobium concentrate in the embodiments 1-2 and the comparative examples 1-2 is determined;

Based on *Methods for Chemical Analysis of Gypsum* (GB/T 5484-2012), the contents of CaO, $SO_3$, $Fe_2O_3$, $Al_2O_3$ and $SiO_2$ indexes in the gypsum product in the embodiments 1-2 and the comparative examples 1-2 are determined;

Based on *Methods for Chemical Analysis of Silicate Rocks—Part 31: Determination of 12 Components*

Including Silicon Dioxide Etc.—Lithium Metaborate Fusion—Inductively Coupled Plasma Atomic Emission Spectrometry (GB/T 14506.31-2019), the contents of $SiO_2$, $Al_2O_3$, $Fe_2O_3$, $SO_3$, CaO, $K_2O$, $Na_2O$, $TiO_2$, $Ta_2O_5$, $Nb_2O_5$, $Li_2O$, $P_2O_5$ and $B_2O_3$ indexes in the silicon aluminum micro-powder in the embodiments 1-2 and the comparative examples 1-2 are determined. The statistics of the test results of the index contents of the silicon aluminum micro-powder product in the embodiments 1-2 and the comparative examples 1-2 are shown in Table 2.

TABLE 2

Components and contents of silicon aluminum micro-powder product

| | Component | | | | | | |
|---|---|---|---|---|---|---|---|
| | $SiO_2$ (%) | $Al_2O_3$ (%) | $Fe_2O_3$ (%) | $SO_3$ (%) | CaO (%) | $K_2O$ (%) | $Na_2O$ (%) |
| Embodiment 1 | 66.49 | 24.31 | 0.38 | 0.18 | 0.29 | 0.43 | 0.34 |
| Embodiment 2 | 65.76 | 23.97 | 0.40 | 0.13 | 0.32 | 0.52 | 0.26 |
| Embodiment 3 | 63.96 | 24.15 | 0.42 | 0.20 | 0.26 | 0.45 | 0.30 |
| Comparative example 1 | 64.88 | 24.52 | 0.67 | 0.58 | 0.31 | 0.66 | 0.47 |
| Comparative example 2 | 65.71 | 24.13 | 0.69 | 0.61 | 0.35 | 0.62 | 0.39 |

| | Component | | | | | |
|---|---|---|---|---|---|---|
| | $TiO_2$ (%) | $Ta_2O_5$ (ppm) | $Nb_2O_5$ (ppm) | $Li_2O$ (%) | $P_2O_5$ (%) | $B_2O_3$ (%) |
| Embodiment 1 | 0.042 | 38 | 25 | 0.31 | 0.31 | 0.14 |
| Embodiment 2 | 0.064 | 35 | 28 | 0.30 | 0.30 | 0.11 |
| Embodiment 3 | 0.039 | 40 | 27 | 0.33 | 0.35 | 0.16 |
| Comparative example 1 | 0.032 | 36 | 29 | 0.46 | 0.34 | 0.094 |
| Comparative example 2 | 0.045 | 31 | 26 | 0.44 | 0.37 | 0.12 |

Note: In view of the low tantalum and niobium content in silicon aluminum micro-powder product, the test results of different batches of silicon aluminum micro-powder product have a certain fluctuation range, and the test results of the same silicon aluminum micro-powder product based on GB/T 15076.1-2017 and GB/T 15076.2-2019 also have fluctuations, which is a normal phenomenon. The results of $Nb_2O_5$ and $Ta_2O_5$ in Table 2 are the average values of the same sample after three parallel measurements.

The statistics of the index content test results of the tantalum niobium concentrate product and the recovery rate results of the tantalum niobium concentrate product in the embodiments 1-2 and the comparative examples 1-2 are shown in Table 3.

TABLE 3

| Components and contents of tantalum niobium concentrate product | | Recovery rate of tantalum niobium concentrate | |
|---|---|---|---|
| Component | | | |
| $Ta_2O_5$ (%) | $Nb_2O_5$ (%) | $Ta_2O_5$ (%) | $Nb_2O_5$ (%) |
| Embodiment 1 | 17.39 | 13.38 | 54.17 | 50.14 |
| Embodiment 2 | 16.15 | 12.58 | 56.42 | 52.59 |
| Embodiment 3 | 16.84 | 12.49 | 54.67 | 51.08 |
| Comparative example 1 | 15.04 | 9.29 | 50.90 | 49.58 |
| Comparative example 2 | 14.58 | 8.93 | 50.12 | 48.32 |

The statistics of the test results of the gypsum product components and contents in the embodiments 1-2 and the comparative examples 1-2 are shown in Table 4.

TABLE 4

Components and contents of gypsum product

| | Component | | | | |
|---|---|---|---|---|---|
| | CaO (%) | $SO_3$ (%) | $Fe_2O_3$ (%) | $Al_2O_3$ (%) | $SiO_2$ (%) |
| Embodiment 1 | 31.12 | 43.51 | 0.37 | 2.18 | 0.90 |
| Embodiment 2 | 32.54 | 42.98 | 0.35 | 2.32 | 0.85 |
| Embodiment 3 | 30.89 | 42.88 | 0.41 | 2.09 | 0.92 |
| Comparative example 1 | 13.99 | 19.34 | 0.58 | 12.81 | 35.71 |
| Comparative example 2 | 14.84 | 20.97 | 0.56 | 12.27 | 34.29 |

The statistics of the test results of the lithium rich iron material product components and contents in the embodiments 1-2 and the comparative examples 1-2 are shown in Table 5.

TABLE 5

Components and contents of lithium rich iron material product

| | component | | | | |
|---|---|---|---|---|---|
| | $SiO_2$ (%) | $Al_2O_3$ (%) | $Fe_2O_3$ (%) | $Ta_2O_5$ (ppm) | $Nb_2O_5$ (ppm) |
| Embodiment 1 | 64.12 | 24.35 | 3.43 | 67 | 42 |
| Embodiment 2 | 64.38 | 24.84 | 3.61 | 52 | 47 |
| Embodiment 3 | 63.97 | 24.17 | 3.35 | 61 | 44 |
| Comparative example 1 | 64.25 | 25.37 | 3.76 | 63 | 45 |
| Comparative example 2 | 64.34 | 24.95 | 3.41 | 59 | 48 |

| | component | | | | |
|---|---|---|---|---|---|
| | $Li_2O$ (%) | $SO_3$ (%) | CaO (%) | $Na_2O + K_2O$ (%) | |
| Embodiment 1 | 1.02 | 0.33 | 1.13 | 0.89 | — |
| Embodiment 2 | 0.96 | 0.19 | 1.19 | 0.92 | — |
| Embodiment 3 | 0.93 | 0.25 | 1.15 | 0.95 | — |
| Comparative example 1 | 0.89 | 0.21 | 1.26 | 0.87 | — |
| Comparative example 2 | 0.86 | 0.21 | 1.18 | 0.86 | — |

Note: In view of the low tantalum and niobium content of the lithium rich iron material product, the test results of different batches of lithium rich iron material products have a certain fluctuation range, and the test results of the same lithium rich iron material product samples based on GB/T 15076.1-2017 and GB/T 15076.2-2019 also have fluctuations, which is a normal phenomenon. The results of $Nb_2O_5$ and $Ta_2O_5$ in Table 5 are the average values of the same sample after three parallel measurements.

Seen from Tables 1-4, the sulfur content and iron content in the silicon aluminum micro-powder obtained in the experiment examples 1-2 in Table 1 are both lower than those in the comparative examples 1-2, indicating that the solid-liquid pre-separation is adopted after pulping the lithium extraction acid clinker, and the gypsum in the lithium extraction acid clinker is separated first to avoid the mixing of gypsum and other minerals, and the silicon aluminum micro-powder obtained after treatment of the filter residue has a low sulfur content; meanwhile, due to the solid-liquid pre-separation process, the free iron in the leaching solution of the lithium extraction acid clinker is separated from other minerals, which can avoid the formation of colloids of free iron in the neutralization process and adsorbing no the surface of the silicon aluminum micro-powder. Therefore, the iron content in the silicon aluminum micro-powder product can be reduced through pre-separation; in the traditional process in the comparative examples 1-2, the lithium excavation acid clinker is neutralized after leaching and the colloidal iron produced by free iron is adsorbed no the surface of mineral particles. Although the gypsum product is obtained by flotation desulfurization, since the colloidal iron is non-magnetic material, the iron content is still relatively high in the silicon aluminum micro-powder obtained in the post-treatment process of weak magnetic separation and strong magnetic separation; the low iron and low sulfur silicon aluminum micro-powder products obtained in the embodiments 1 and 2 have a higher whiteness due to the reduction of iron, and when the free iron ion is neutralized with the silicon aluminum micro-powder, the free iron forms colloidal iron and adsorbs to the surface of the silicon aluminum micro-powder, resulting in the silicon aluminum micro-powder in the color of beige.

In Table 2, the contents of $Nb_2O_5$ and $Ta_2O_5$ in the tantalum niobium concentrate product in the embodiments 1-2 are superior to those in the comparative examples 1-2, especially the $Nb_2O_5$ content, and the $Nb_2O_5$ content in the embodiment 2 is increased by 35.41% compared with the tantalum niobium concentrate product in the comparative example 1; in the embodiments 1-2, the lithium extraction acid clinker is filtered first, and then the filtrate and the filter residue are treated respectively, which is conducive to improving the quality of the tantalum niobium concentrate; meanwhile, the embodiments 1-2 do not need flotation desulfurization, thus reducing the entailment of tantalum, niobium and other minerals in gypsum, resulting in excellent quality of the tantalum niobium concentrate product, and improving the recovery rate of tantalum niobium.

In Table 3, the contents of CaO and $SO_3$ in the gypsum product in the embodiments 1-2 are greater than those in the comparative examples 1-2, and the contents of iron, aluminum and silicon are lower than those in the comparative examples 1-2, indicating that the traditional flotation desulfurization process makes it difficult to separate gypsum from other minerals, resulting in low purity of the obtained gypsum concentrate, and high-grade gypsum can only be obtained through concentration; if concentration is adopted, additional process is needed, and meanwhile a certain amount of secondary slag is produced; the present invention adopts the acid-base neutralization process in liquid and can finally obtain high-grade gypsum product, and no secondary slag is produced in the gypsum separation process.

In Table 4, both the method of the present invention and the traditional process can obtain higher grade lithium rich iron material, which creates better conditions for the subsequent lithium recovery from lithium rich iron material and is conducive to realizing the purpose of high-value utilization.

The invention claimed is:

1. A method of extracting lithium from spodumene and meanwhile recovering low iron and low sulfur silicon aluminum micro-powder, high purity gypsum, tantalum niobium concentrate and lithium rich iron material, wherein the method comprises the following steps:
   a: Mix and leach a lithium extraction acid clinker of spodumene with water to obtain a leached pulp;
   b: Filter the leached pulp from step a to obtain a filtrate and a filter residue, wash the filter residue with water to obtain a washing liquid and a filter residue 1, and combine the washing liquid with the filtrate to obtain ta filtrate 1;
   c: Neutralize the filtrate 1 from step b to obtain a neutralized pulp;
   d: Filter the neutralized pulp from step c to obtain a second filtrate and a second filter residue, wash the second filter residue with water to obtain a second washing liquid and a high purity gypsum, combine the second washing liquid with the second filtrate to obtain a filtrate 2, and extract lithium from the filtrate 2 to obtain lithium salt;
   e: Neutralize and mix the filter residue 1 from step b to obtain coarse and fine particles by classification;
   f: Grind the coarse particles from step e until at least 70 wt % of the ground particles passes 325 mesh;
   g: Perform a weak magnetic separation at a magnetic field intensity of 0.05-0.5 Tesla on of the fine particles from step e to obtain a lithium rich iron material 1 and a non-magnetic material;
   h: Perform a strong magnetic separation at a magnetic field intensity of 1.0-1.7 Tesla on the non-magnetic material from step g to obtain low iron and low sulfur silicon aluminum micro-powder and a weak magnetic material;
   i: Perform gravity separation on the weak magnetic material from step h to obtain a lithium rich iron material 2 and a tantalum niobium crude concentrate; and
   j: Pickle the tantalum niobium crude concentrate from step i with an acid to obtain a tantalum niobium concentrate.

2. The method of extracting lithium from spodumene and meanwhile recovering low iron and low sulfur silicon aluminum micro-powder, high purity gypsum, tantalum niobium concentrate and lithium rich iron material according to claim 1, characterized in that: in step a, the total solid concentration of the leached pulp, comprising insoluble residues in lithium extraction acid clinker, is maintained within 30-60 wt %.

3. The method of extracting lithium from spodumene and meanwhile recovering low iron and low sulfur silicon aluminum micro-powder, high purity gypsum, tantalum niobium concentrate and lithium rich iron material according to claim 1, wherein: in step a, the lithium extraction acid clinker is obtained from spodumene concentrate through high temperature phase transition, meanwhile react with concentrated sulfuric acid.

4. The method of extracting lithium from spodumene and meanwhile recovering low iron and low sulfur silicon aluminum micro-powder, high purity gypsum, tantalum niobium concentrate and lithium rich iron material according to claim 1, wherein: in step c, alkali 1 is added to the filtrate 1 to regulate pH to 6-7.

5. The method of extracting lithium from spodumene and meanwhile recovering low iron and low sulfur silicon aluminum micro-powder, high purity gypsum, tantalum niobium concentrate and lithium rich iron material according to claim 4, wherein: the alkali 1 is any one or more of calcium carbonate, calcium hydroxide and calcium oxide.

6. The method of extracting lithium from spodumene and meanwhile recovering low iron and low sulfur silicon aluminum micro-powder, high purity gypsum, tantalum niobium concentrate and lithium rich iron material according to claim 1, characterized in that: in step c, the solid concentration of the neutralized pulp, comprising generated purity gypsum by neutralization, is maintained within 5-20 wt %.

7. The method of extracting lithium from spodumene and meanwhile recovering low iron and low sulfur silicon aluminum micro-powder, high purity gypsum, tantalum niobium concentrate and lithium rich iron material according to claim 1, wherein: the filtration in step d is carried by out employing at least one of a plate-and-frame filter press, a belt filter and a centrifuge.

8. The method of extracting lithium from spodumene and meanwhile recovering low iron and low sulfur silicon aluminum micro-powder, high purity gypsum, tantalum niobium concentrate and lithium rich iron material according to claim 1, characterized in that: in step e, the neutralizing and mixing is to add alkali 2 to the filter residue 1 for pulping and regulate the pH to 6.5-7.5, and the solid concentration of the neutralized and mixed pulp, comprising the residue 1, is maintained within 30-40 wt %.

9. The method of extracting lithium from spodumene and meanwhile recovering low iron and low sulfur silicon aluminum micro-powder, high purity gypsum, tantalum niobium concentrate and lithium rich iron material according to claim 8, wherein: the alkaline substance added as the alkali 2 in step e is at least one of calcium carbonate, calcium hydroxide and calcium oxide.

10. The method of extracting lithium from spodumene and meanwhile recovering low iron and low sulfur silicon aluminum micro-powder, high purity gypsum, tantalum niobium concentrate and lithium rich iron material according to claim 1, wherein: in step e, the classification is carried out using at least one of hydrocyclone, mechanical vibrating screen and spiral classifier.

11. The method of extracting lithium from spodumene and meanwhile recovering low iron and low sulfur silicon aluminum micro-powder, high purity gypsum, tantalum niobium concentrate and lithium rich iron material according to claim 1, wherein: in step f, the grinding is at least one of ball mill grinding, vertical mill grinding and tower mill grinding.

12. The method of extracting lithium from spodumene and meanwhile recovering low iron and low sulfur silicon aluminum micro-powder, high purity gypsum, tantalum niobium concentrate and lithium rich iron material according to claim 1, wherein: in step f, the grinding is ball mill grinding; and the ball mill medium of the ball mill grinding is a steel ball, a steel forging, a steel bar, a zirconia ball, an alumina ball or a ceramic ball.

13. The method of extracting lithium from spodumene and meanwhile recovering low iron and low sulfur silicon aluminum micro-powder, high purity gypsum, tantalum niobium concentrate and lithium rich iron material according to claim 1, characterized in that: in step f, the solid concentration of the grinding pulp, comprising the coarse particles, is maintained within 40-60 wt %.

14. The method of extracting lithium from spodumene and meanwhile recovering low iron and low sulfur silicon aluminum micro-powder, high purity gypsum, tantalum niobium concentrate and lithium rich iron material according to claim 1, characterized in that: in step g, the feed solid concentration of the weak magnetic separation, pulp, comprising the fine particles, is maintained within 20-30 wt %.

15. The method of extracting lithium from spodumene and meanwhile recovering low iron and low sulfur silicon aluminum micro-powder, high purity gypsum, tantalum niobium concentrate and lithium rich iron material according to claim 1, characterized in that: in step h, the feed solid concentration of the strong magnetic separation pulp, comprising the non-magnetic particles, is maintained within 15-25 wt %.

16. The method of extracting lithium from spodumene and meanwhile recovering low iron and low sulfur silicon aluminum micro-powder, high purity gypsum, tantalum niobium concentrate and lithium rich iron material according to claim 1, characterized in that: in step i, the feed solid concentration of the gravity separation pulp, comprising the weak magnetic particles, is maintained within 10-30 wt %.

17. The method of extracting lithium from spodumene and meanwhile recovering low iron and low sulfur silicon aluminum micro-powder, high purity gypsum, tantalum niobium concentrate and lithium rich iron material according to claim 1, wherein: the gravity separation in step i is carried out by employing at least one of a table concentrator, a spiral chute, a blanket machine, a centrifuge and a reciprocating separator.

18. The method of extracting lithium from spodumene and meanwhile recovering low iron and low sulfur silicon aluminum micro-powder, high purity gypsum, tantalum niobium concentrate and lithium rich iron material according to claim 1, wherein: the pickling is carried out by employing the acid used in step j with a concentration of 5-40%, and the acid is at least one of sulfuric acid, hydrochloric acid and oxalic acid.

\* \* \* \* \*